United States Patent [19]
Sanders et al.

[11] Patent Number: 6,004,469
[45] Date of Patent: Dec. 21, 1999

[54] PROCESS FOR REMOVING $H_2O_2$ FROM AQUEOUS STREAMS

[75] Inventors: Michele W. Sanders; Larry E. Campbell, both of Knoxville, Tenn.

[73] Assignee: Advanced Catalyst Systems, Inc., Knoxville, Tenn.

[21] Appl. No.: 09/014,543

[22] Filed: Jan. 28, 1998

[51] Int. Cl.[6] ................................................ C02F 1/72
[52] U.S. Cl. .................. 210/763; 252/186.2; 423/599; 423/604
[58] Field of Search ..................... 210/763; 423/599, 423/604, 605; 252/186.2, 186.25

[56] References Cited

U.S. PATENT DOCUMENTS

| | | | |
|---|---|---|---|
| 3,884,836 | 5/1975 | Kuhl et al. | 252/455 R |
| 3,887,696 | 6/1975 | Bernard et al. | 423/579 |
| 4,416,982 | 11/1983 | Tsuda et al. | 435/11 |
| 5,287,392 | 2/1994 | Cowan II et al. | 376/301 |
| 5,711,146 | 1/1998 | Armstrong et al. | 60/218 |

Primary Examiner—David A. Simmons
Assistant Examiner—Betsey Morrison
Attorney, Agent, or Firm—Kenneth H. Johnson

[57] ABSTRACT

A process for the decomposition of hydrogen peroxide wherein aqueous streams containing 1 to 500,000 ppm $H_2O_2$ are contacted with a Mn/Cu catalyst component on a monolith carrier to eliminate the $H_2O_2$ by decomposition to water and oxygen.

33 Claims, 5 Drawing Sheets

PROCESS FOR REMOVING $H_2O_2$ FROM AQUEOUS STREAMS

BACKGROUND OF THE INVENTION

1. Field of the Invention

The present invention relates to the use of base metal catalyst for the decomposition of excess hydrogen peroxide used in chemical processes, disinfecting, or bleaching. The catalyst is copper oxide and manganese dioxide on alumina which is coated onto a substrate. The majority of the peroxide is removed by the catalyst and polishing can be achieved by the addition of small quantities of reagents such as $SO_2$.

2. Related Art

In some chemical processes, hydrogen peroxide ($H_2O_2$) is added to oxidize a chemical intermediate. It is also used as a bleaching agent for products from the textile and paper industries. Hydrogen peroxide is an environmentally friendly chemical for tertiary water treatment since its products of decomposition are water and oxygen. It is expected that hydrogen peroxide will be used more frequently in the future as costs decrease and environmental pressures for clean water increase.

Hydrogen peroxide is sometimes added in excess to a process to accelerate the reaction rate. The excess must be removed before the next stage of processing or before discharging an effluent. In some cases where reverse osmosis is used to recover and/or recycle the waste water, the hydrogen peroxide must be removed in order to protect the osmosis membrane.

Currently, excess hydrogen peroxide is destroyed by adding reducing chemicals such as $SO_2$ to the stream. While this is an effective method of destruction, the cost can be high, especially if $H_2O_2$ concentrations are high.

The present invention is a cost effective method of hydrogen peroxide removal wherein catalyst is placed in the process line. The catalyst can be used in solutions containing from 1 to 500,000 ppm $H_2O_2$.

SUMMARY OF THE INVENTION

In the present process a manganese/copper supported catalyst is deposited on a carrier contacted with a process fluid under conditions of hydrogen peroxide decomposition. The molar ratio of Mn:Cu is preferably 5:1 to 1:1 and more preferably 3:1 to 1:1. Preferably the support is a high surface area alumina.

Preferably the pH of the process fluid is in the range of 5 to 11 for contact with the supported catalyst at temperature in the range of about 10 to 100° C. The LHSV (Liquid Hourly Space Velocity expressed as $hr^{-1}$) is operated at the highest rate possible to achieve an acceptable degree of $H_2O_2$ decomposition. Shorter residence times result in a drop of percent $H_2O_2$ decomposition for any given system. Optimal rates of LHSV for maximized $H_2O_2$ decomposition are from 5 $hr^{-1}$ up to about 75 $hr^{-1}$, preferably up to about 30 $hr^{-1}$ The term "high surface area" as used herein means greater than 1 sq. meter/g.

Suitable carriers are monoliths sometimes described as honeycombs or foams made of ceramics or metals such as steel or aluminum.

DETAILED DESCRIPTION

Figure 1:
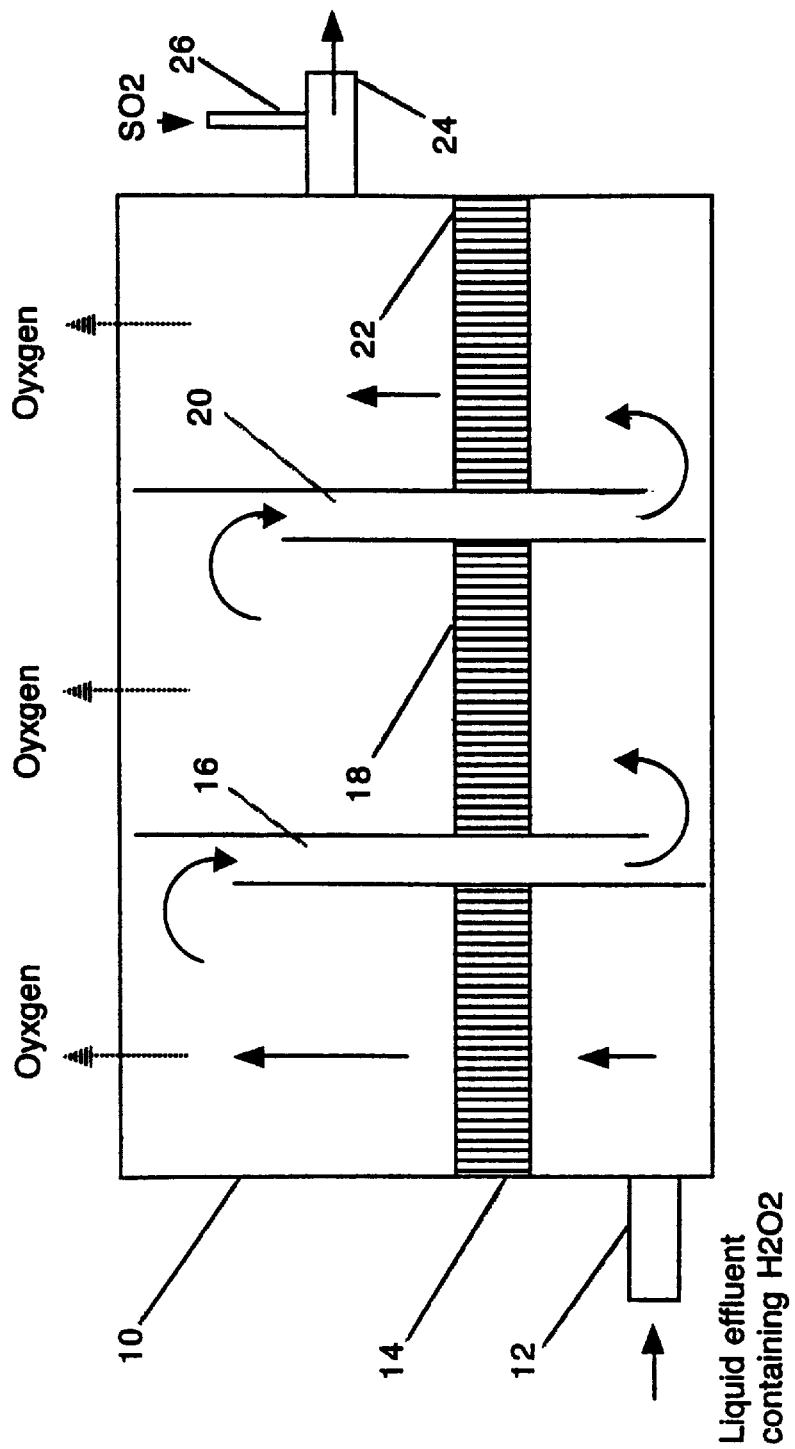
FIG. 1 is a schematic representation of a multibed reactor for carrying out the present process.

The base metal washcoat may be prepared by applying a solution of cupric nitrate ($Cu(NO_3)_2$) and potassium permanganate ($KMnO_4$) to high surface area alumina powder by the method of incipient wetness. The copper and manganese compounds can be reduced and/or precipitated with a solution of a carbohydrate such as sucrose. The powder is washed to remove potassium hydroxide and then milled with dilute acetic acid into a high surface area catalytically active washcoat. The copper component and manganese component may be applied to the carrier in any order, however, concurrent deposition is preferred.

The manganese component preferably comprises 2 to 50 weight percent of the catalyst component and the copper component preferably comprises 1 to 40 weight percent of the catalyst component, preferably as oxides, more preferably 5 to 25 wt. % manganese as $MnO_2$ and 2.5 to 15 wt. % copper as $CuO$ of the washcoat composition. The catalyst component (including the washcoat) comprises 5 to 20 wt. % of the total weight of the carrier and catalyst component.

The high surface area support may be made of alumina, zirconia, titania, silica or a combination of two or more of these oxides. Preferably, the high surface area support is made of alumina. The surface area of the support is in the range of 50 to 350 square meters per gram, preferably 100 to 325 square meters per gram, and more preferably 100 to 200 square meters per gram.

The composition of the ceramic carrier can be any oxide or combination of oxides. Suitable oxide supports include the oxides of Al ($\alpha-Al_2O_3$), Zr, Ca, Mg, Hf, and Ti.

The structure and composition of the carrier is of great importance. The structure of the carrier affects the flow patterns through the catalyst system which in turn affect the transport to and from the catalyst surface. The ability of the structure to effectively transport the species to be catalyzed to the catalyst surface influences the effectiveness of the catalyst. The carrier is preferably macroporous with 100 to 600 cells (pores) per square inch (cpsi) which is about 30 to 80 pores per linear inch (ppi), although carriers having 10 to 90 ppi are suitable. The pores should yield a tortuous path for the reactants and products such as is found in foam ceramics and metals (generally understood to include honeycomb or foam structures). Straight channel extruded ceramic or metal monoliths yield suitable flow dynamics only if the pore size is very small with greater than 14 pores per linear inch.

Ceramic honeycomb is the preferred catalyst carrier because it is a high surface area material that is easy to coat, it has a low pressure drop in the liquid process stream and it is available in a variety of cell counts per square inch. The honeycomb is preferably made from cordierite and is coated with the catalytically active washcoat and placed inside a multibed reactor, preferably placed in a horizontal or side by side arrangement to allow oxygen offgas to escape during treatment.

The optimum flow rate will depend upon such variables as pressure, the temperature of the reaction and pore size or channel size depending on the type of support. The process rate of the catalyst is measured as the linear velocity of the liquid feedstream per volume of chamber containing catalyst per hour, referred to as the liquid hourly space velocity (LHSV).

The equation for the decomposition of hydrogen peroxide is:

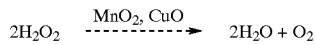

$$2H_2O_2 \xrightarrow{MnO_2, CuO} 2H_2O + O_2$$

The catalyst vessel should be vented for removal of oxygen produced from the reaction. Preferably ambient pressure is used, generally 0 to 1 psig. The catalyst is placed horizontally in the vessel and the process fluid flows through the catalyst from the bottom to the top. This allows oxygen bubbles to dissipate from the fluid for collection or venting. An arrangement of multiple beds of catalyst, each allowing oxygen to disengage, is an effective way to remove high concentrations of $H_2O_2$.

EXAMPLES

Catalyst Preparation

A. Washcoat Preparation
1. Raw Materials
   a. Deionized Water-any source
   b. Potassium Permanganate, Cairox-Carus Chemical, obtained from Greenway Chemical (Knoxville, Tenn.)
   c. Cupric Nitrate—technical grade; Baker-Mallinckrodt (Phillipsburg, N.J.)
   d. Alumina, Puralox SCF a-160—Condea Chemie GmbH (Brunsbuttel, Germany)
   e. Glacial Acetic Acid—any source; 99.5% pure technical grade obtained from Greenway Chemical (Knoxville, Tenn.)
   f. Octanol—Mallinckrodt Chemical (Paris, Ky.)
   g. Sucrose—any source; food grade obtained from local supermarket
2. Washcoat Procedure The first step in manufacturing the $H_2O_2$ catalyst is to prepare the washcoat. The dry washcoat powder after preparation is 13.0% manganese dioxide ($MnO_2$) and 6.1% cupric oxide (CuO) on Puralox SCF a-160 alumina powder. A given weight of powder is wetted to the point of incipient wetness (50% of the dry weight of the powder) with a solution of 19.5 wt% $KMnO_4$ and 4.6 wt% $Cu(NO_3)5H_2O$. After drying at 125° C., the powder is again saturated to the point of incipient wetness with a solution of 1.5% sucrose which reduces the $KMnO_4$ to $MnO_2$ and precipitates $Cu(OH)_2$ when heated again to 125° C. The procedure is repeated 2 times more with the same concentrations and weights of $KMnO_4$ and $Cu(NO_3)5H_2O$ solution, the powder being dried and reduced again with 1.5% sucrose solution and heated at 125° C. The powder is now 13.0% $MnO_2$ and 7.5% $Cu(OH)_2$.

One of the by-products of the reduction of $KMnO_4$ to $MnO_2$ is KOH. The powder is washed with 0.5% acetic acid to neutralize the KOH and rinsed with deionized $H_2O$ to remove $KC_2H_3O_2$ and any other soluble by-products. The powder is filtered with medium filter paper to remove as much water as possible and then dried at 125° C.

The powder is then milled with an equal weight plus 10% of 1.5% acetic acid and a small amount of a defoaming agent, such as octanol, in a ceramic roller mill one-half full of ceramic milling media for 3–6 hours at 32 RPM. The resulting suspension has a specific gravity of 1.40, a pH of 4.6 and is approximately 42% solids.

B. Honeycomb Carrier Washcoat Application

The ceramic honeycomb carrier is Ceclor brand made by Corning Glass, Inc., Corning, N.Y. It is a high surface area material made of cordierite which is magnesium aluminum silicate. The carrier is dipped in the washcoat suspension slowly and allowed to soak for 45 seconds, after which the cells are blown with compressed air to clear them. After dipping, the blocks have been coated with enough suspension to weight 25% more than their original weight. The coated blocks are dried at 125° C. and are calcined at 300° C. to 500° C. and preferably at 350° C. to 450° C. to drive off water and other volatile agents.

Catalyst Testing

Testing Procedure

The catalyst is tested in a vertical reactor made of pyrex or plastic. The process fluid is heated to the process temperature in a boiling flask and then pumped to the reactor which contains the catalyst. The fluid flows from the bottom of the catalyst through the channels and out of the top of the catalyst. The reactor is open on the top or vented to the atmosphere to allow oxygen gas produced during the reaction to escape. The catalyst is sealed around the edges to prevent fluid bypass.

FIG. 1 shows a multiple bed cascading type reactor 10. The liquid enters the reactor on the left through pipe 12, travels through the first catalyst bed 14 and overflows via overflow 16 into the area containing the second catalyst bed 18. After traveling through the second bed 18, the liquid overflows into overflow 20 hence into the area containing the third catalyst bed 22 out of pipe 24. Oxygen can disengage from the liquid at the top of each catalyst bed, which increases surface area contact for the next catalyst bed. A polishing line 26 is provided to allow for a final $SO_2$ treatment of the effluent from the reactor if required.

The solution used for these experiments was an effluent from a textile bleaching process. The effluent contained 500–750 ppm $H_2O_2$, soaps and detergents, an iron chelating agent (EDTA), and cotton fibers. In the process, the water in the effluent is recycled by purifying with reverse osmosis. Hydrogen peroxide in the effluent must be removed because it attacks the reverse osmosis membranes.

The concentration of $H_2O_2$ is analyzed before and after the catalyst by titration. Potassium permanganate can be used as the titrant if no other oxidizable material is present. Cerium (IV) sulfate is used if there is oxidizable organic material present. $H_2O_2$ concentration is given by the equation:

$$\text{ppm } H_2O_2 = \frac{\text{mL titrant} \times \text{N titrant} \times 1.701 \times 10.000}{\text{grams sample}}$$

Cerium (IV) sulfate was the titrant used for these experiments since there was oxidizable organic material present in the effluent.

Catalyst samples are tested at different flow rates and % $H_2O_2$ destruction calculated at each flow rate. The results are graphed as % $H_2O_2$ destruction versus liquid hourly space velocity (LHSV) at a 150° F. temperature. LHSV is defined as flow rate (cc/hr) per volume catalyst (cc) and is given in units of $hr^{-1}$ using the catalyst described in Example 1.

Figure 2:
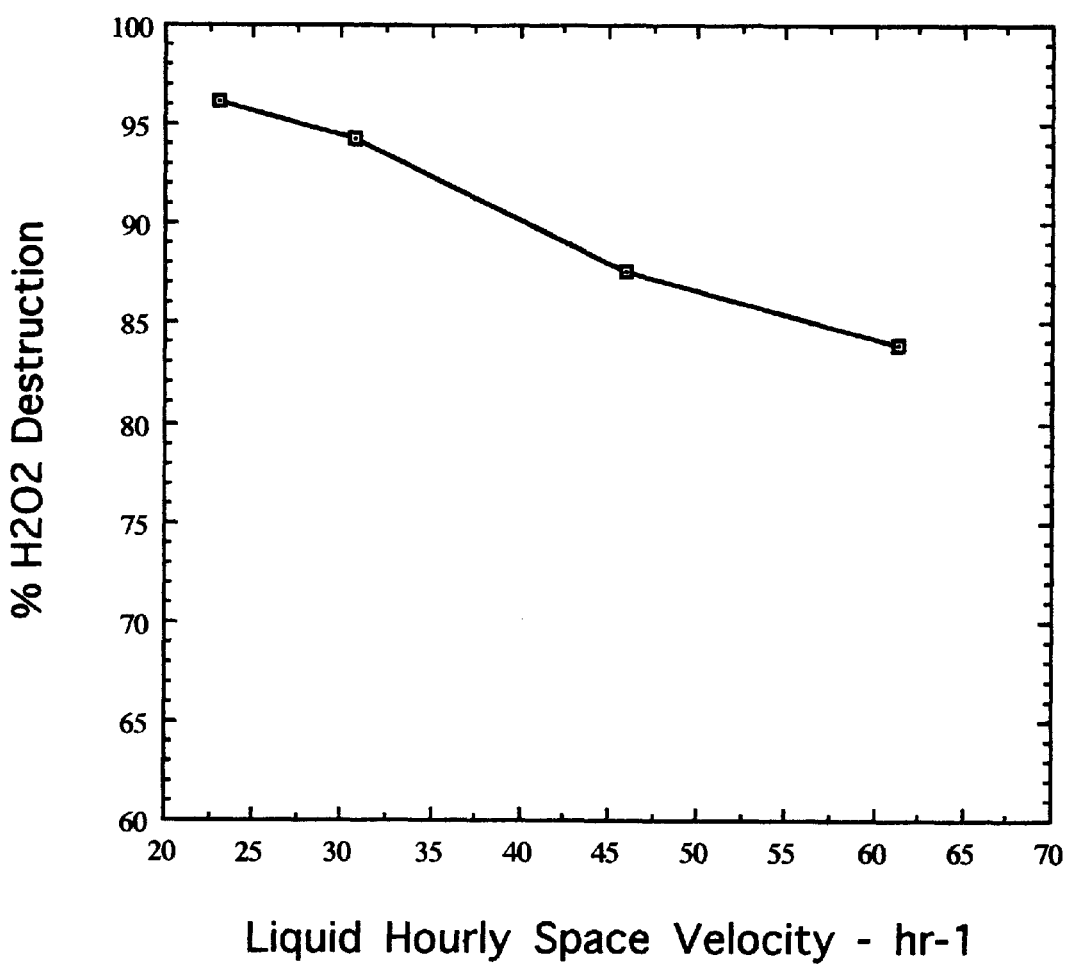
FIG. 2 is a graph illustrating the effect of residence time on $H_2O_2$ decomposition using a 200 cpsi carrier.

FIG. 2 shows the effect of LHSV on $H_2O_2$ destruction for the process effluent from textile bleaching. As LHSV increases, linear velocity increases, the amount of liquid processed per unit time increases and the amount of $H_2O_2$ destroyed by the catalyst decreases.

Figure 3:
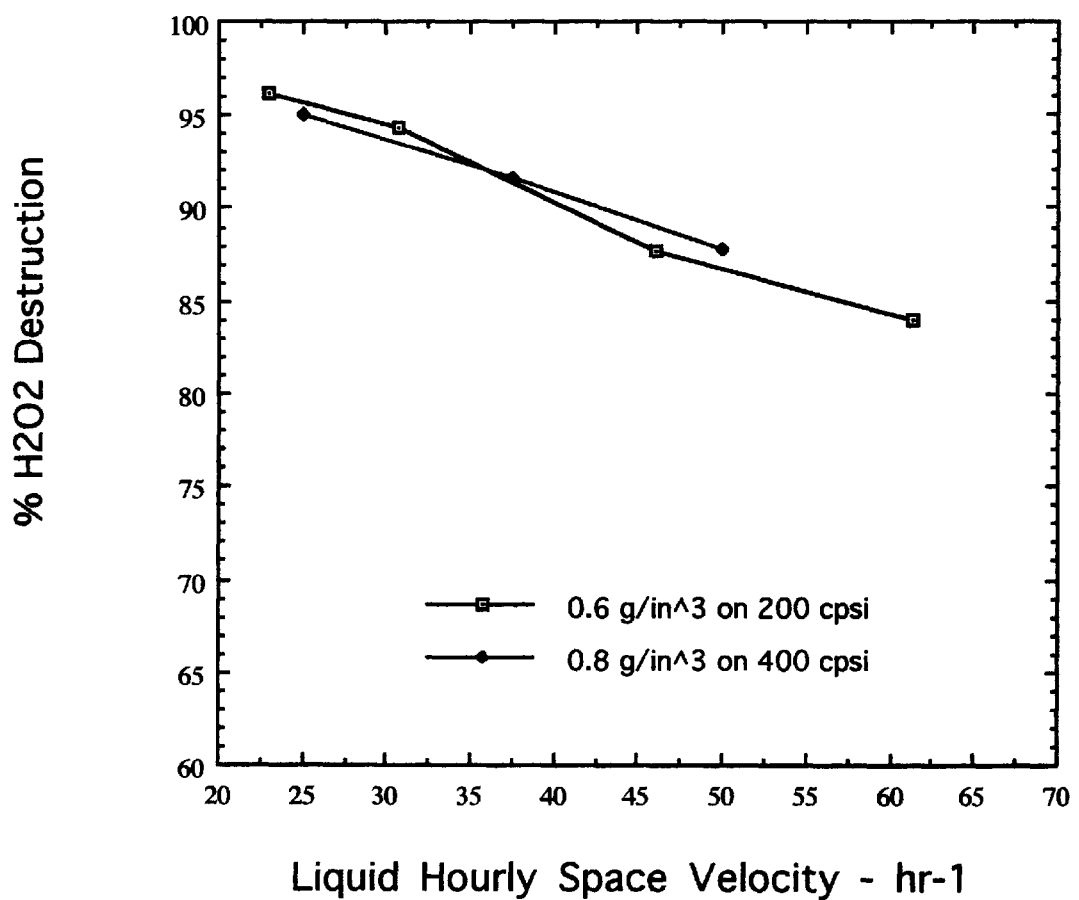
FIG. 3 is a graph illustrating the effect of carrier porosity on $H_2O_2$ decomposition.

Honeycomb blocks with cell counts of 200 (Example 1) and 400 (Example 2) cells per square inch (cpsi) were tested for % $H_2O_2$ destruction on the same textile process effluent. FIG. 3 shows the % $H_2O_2$ was essentially the same for both samples.

Figure 4:
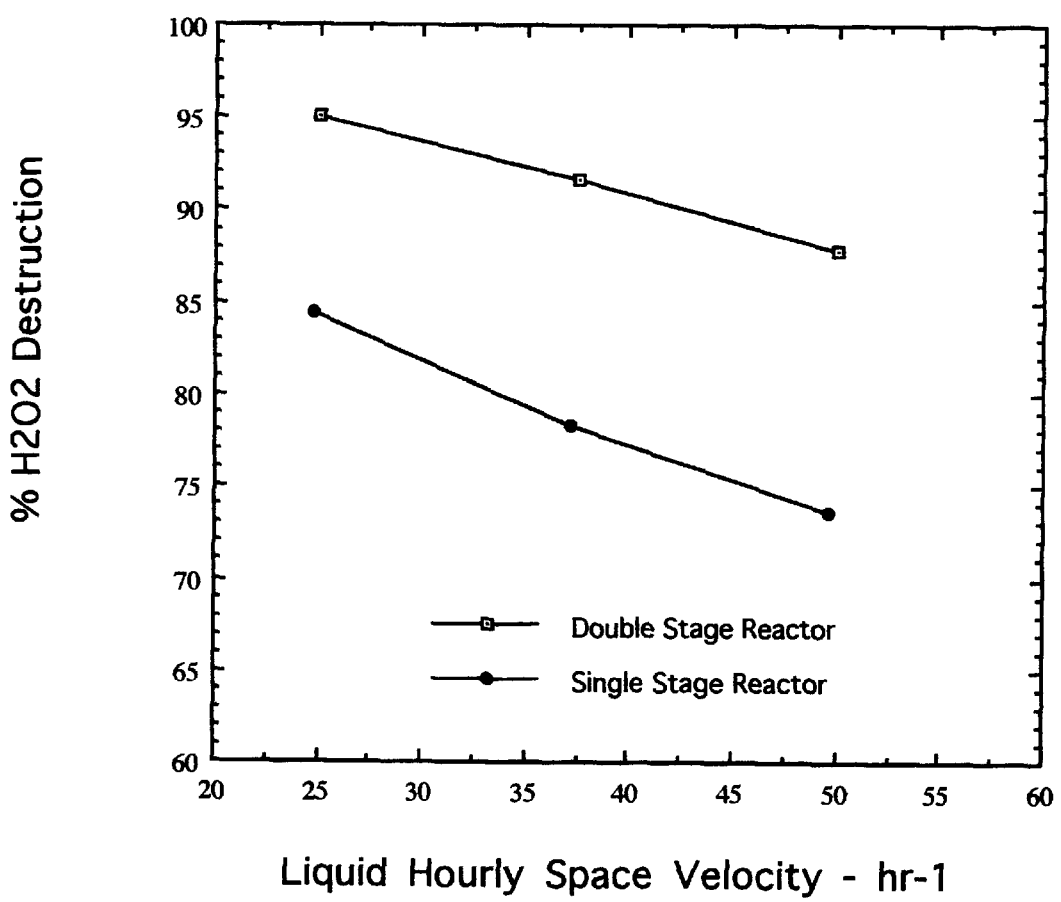
FIG. 4 is a graph illustrating the effect of bed arrangement on $H_2O_2$ decomposition.

Two different types of reactors were tested—a single stage and a double stage. The single stage reactor held 242 cc of catalyst in one bed. The double stage reactor uses the first two stages of the multibed reactor of FIG. 1 which held 242 cc of catalyst divided equally between the two beds. The reactors were tested at the same flow rates and at approximately 140° F. using the catalyst described in Example 1. FIG. 4 shows that the double stage reactor is 12% more effective at removing $H_2O_2$ than the single stage reactor.

Example 1

230 g of washcoat was made by applying 12.5 g $KMnO_4$ and 9.5 g $Cu(NO_3)_2 3H_2O$ in 50 g deionized water to 100 g Puralox SCFa-160 alumina powder by the method of incipient wetness. The powder was dried at 125° C., treated with 50 g of 10% sucrose and dried at 125° C. again. Another 12.5 g $KMnO_4$ and 9.5 g $CU(NO_3)_2 3H_2O$ in 50 g deionized water was applied, the powder dried at 125° C., 50 g of 10% sucrose added and the powder dried again at 125° C. The powder was washed 2 times with 1% acetic acid, rinsed 2 times with deionized water and dried at 125° C. The powder was milled in a ceramic mill with 100 g 7% acetic acid for 8 hours. 75 g of 7% acetic acid was added to recover and dilute the washcoat to a specific gravity of 1.32. The pH was 4.16. The dried coating was 13% $MnO_2$ and 6.1% CuO. Samples were made by dipping preweighed 200 cpsi pieces in this washcoat. The excess was blown off with compressed air and the sample was dried at 125° C. and fired at 300° C. The sample was reweighed and had a washcoat loading of 0.6 g/in^3.

A double stage reactor was used with a textile effluent containing 686 ppm $H_2O_2$ at about 150° F. The results of $H_2O_2$ destruction test are given in FIG. 2.

Example 2

Figure 5:
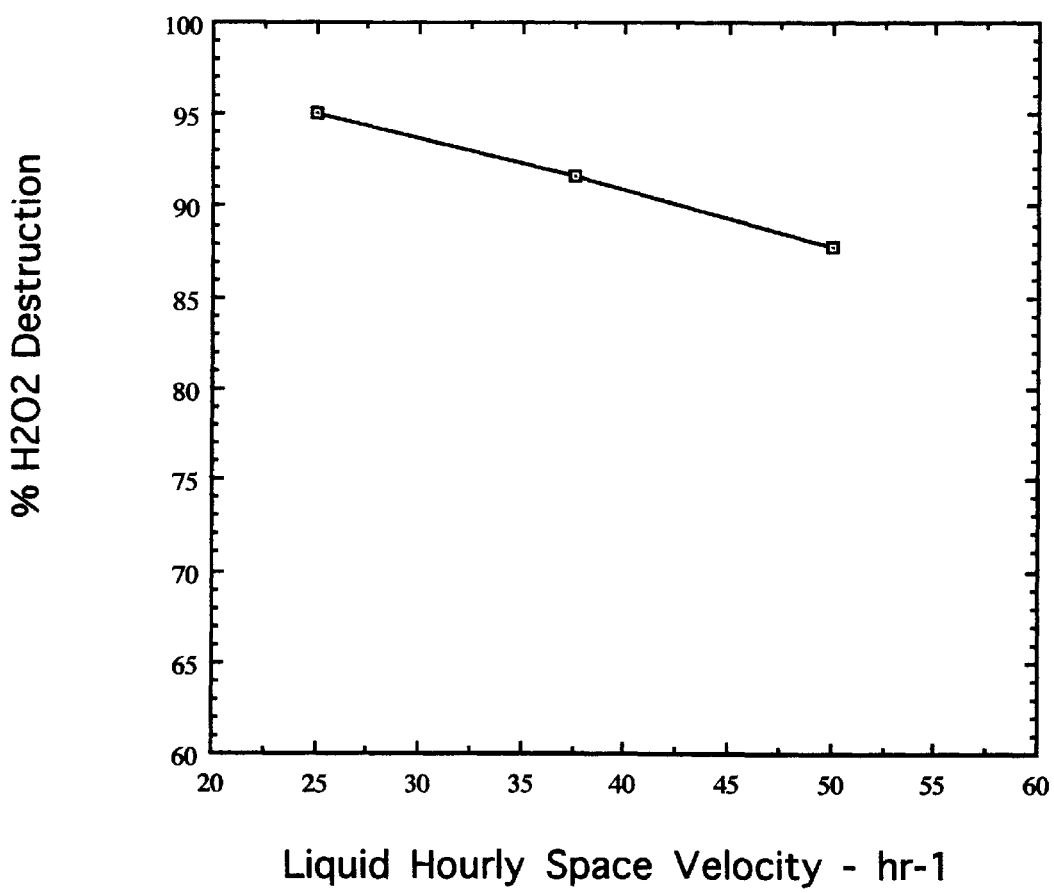
FIG. 5 is a graph illustrating the effect of residence time on $H_2O_2$ decomposition using a 400 cpsi carrier.

The same washcoat was used to coat two 400 cpsi ceramic honeycomb pieces. The samples were coated in the same manner as Example 1. The catalyst loading after firing at 300° C. was 0.8 g/in$^3$. The samples were tested in a double stage reactor using textile effluent containing 686 ppm $H_2O_2$ at about 150° F. The results of testing are shown in FIG. 5.

Example 3

A total of 96 blocks were installed in a stainless steel tank to destroy $H_2O_2$ used for bleaching textiles. The tank was designed as a cascading multiple bed reactor substantially as shown in FIG. 1. Each bed was 4 blocks wide by 8 blocks long. The blocks measured 5.91"×5.91"×6" and were 230 cells/in$^2$. The blocks were suspended on metal screens with 1" square openings over ¼" stainless steel rods. The perimeter of each bed was lined with ⅛" thick fiberglass/vermiculite gasket material that was 4" wide. The blocks were wound with this material so that there was only 1 layer of gasketing material between the blocks and only 1 layer between the blocks and the edge of the bed.

Performance:

Initial performance was determined by titration with $Ce(IV)SO_4$. The titration had some interference from organic material in the effluent. A blank was titrated using effluent that had passed through the catalyst bed and then through a final polishing bed of activated carbon. 100 mL of this final effluent titrated 0.9 mL of 0.1N $CeSO_4$ solution. The blank was subtracted from each titration.

| Sample | Vol Sample | mL Titrant | ppm $H_2O_2$ | % Destruction |
| --- | --- | --- | --- | --- |
| Before Catalyst | 100 mL | 10.44 | 178 | |
| After Bed 1 | 100 mL | 0.96 | 17 | 91.2 |
| After Bed 2 | 100 mL | 0 | 0 | 100 |
| After Bed 3 | 100 mL | 0 | 0 | 100 |

The effluent contains non-ionic surfactants, detergent, defoaming agents and hydrogen peroxide as well as cotton fibers.

The invention claimed is:

1. A process for the removal of $H_2O_2$ from aqueous streams comprising contacting an aqueous stream containing $H_2O_2$ with a catalytic component consisting of a manganese component, a copper component, and a washcoat support comprising the oxides of Al, Zr, Ca, Mg, Hf, Ti or mixtures thereof deposited on a carrier under conditions of $H_2O_2$ decomposition.

2. The process according to claim 1 wherein said copper component comprises copper oxide and said manganese component comprises manganese oxide.

3. The process according to claim 1 wherein the molar ratio of Mn to Cu is in the range of 5:1 to 1:1.

4. The process according to claim 2 wherein the molar ratio of Mn to Cu is in the range of 5:1 to 1:1.

5. The process according to claim 1 wherein said washcoat comprises the oxide of Al.

6. The process according to claim 1 wherein said carrier is a ceramic monolith.

7. The process according to claim 6 wherein said monolith has a honeycomb structure.

8. The process according to claim 6 wherein said monolith comprises a foam.

9. The process according to claim 6 wherein said ceramic monolith comprises cordierite.

10. The process according to claim 1 wherein the manganese component comprises 2 to 50 wt% of said catalyst component and said copper component comprises 1 to 40 wt% of said catalyst component.

11. The process according to claim 10 wherein said catalyst component comprises high surface area alumina washcoat support.

12. The process according to claim 11 wherein said catalyst component comprises from 5 to 20 wt% of the total weight of carrier and catalyst component.

13. The process according to claim 1 wherein from 1 to 500,000 ppm $H_2O_2$ is present in said aqueous stream.

14. The process according to claim 1 wherein the LHSV is up to about 75 hr$^{-1}$.

15. The process according to claim 1 wherein the temperature of the aqueous stream is in the range of about 10 to 100° C.

16. The process according to claim 1 wherein said carrier is metal monolith.

17. The process according to claim 16 wherein said monolith has a honeycomb structure.

18. The process according to claim 16 wherein said monolith is a foam.

19. A proces for the removal of $H_2O_2$ from aqueous streams comprising contacting an aqueous stream containing 1 to 500,000 ppm $H_2O_2$ at an LHSV up to $30hr^{-1}$ at a temperature in the range of 10 to 100° C. with a catalytic component comprising a copper oxide component and a manganese oxide component and a high surface area alumina washcoat support deposited on a carrier to decompose said $H_2O_2$.

20. The process according to claim 19 wherein said catalytic component comprises 2 to 50 wt % of said manganese component, 1 to 40 wt % of said copper component and an alumina washcoat.

21. The process according to claim 20 wherein said catalytic component comprises from 5 to 20 wt % of the total of catalytic composition and carrier.

22. The process according to claim 21 wherein said carrier comprises a ceramic honeycomb monolith having 100 to 600 cpsi.

23. The process according to claim 22 wherein said ceramic monolith comprises cordierite.

24. The process according to claim 21 wherein said metal monolith comprises a metal monolith in a honeycomb structure with 100 to 600 cpsi.

25. The process according to claim 24 wherein said metal monolith comprises stainless steel.

26. The process according to claim 21 wherein said carrier comprises ceramic monolith foam with 10 to 90 ppi.

27. The process according to claim 21 wherein said carrier comprises metal monolith foam.

28. A process for the removal of $H_2O_2$ from aqueous streams comprising contacting an aqueous stream containing $H_2O_2$ with a catalytic component comprising a manganese component, a copper component and a high surface area alumina washcoat support deposited on a carrier under conditions of $H_2O_2$ decomposition.

29. The process according to claim 28 wherein said carrier comprises a monolith having 100 to 600 cpsi.

30. The process according to claim 29 wherein said monolith comprises cordierite.

31. The process according to claim 29 wherein said monolith is a metal monolith.

32. The process according to claim 29 wherein said monolith has a honeycomb structure.

33. The process according to claim 29 wherein said monolith is a foam.

* * * * *